May 27, 1969
K. HÅNNERZ ET AL
3,446,704
MEANS FOR POWER CONTROL IN NUCLEAR REACTORS
Filed March 28, 1967
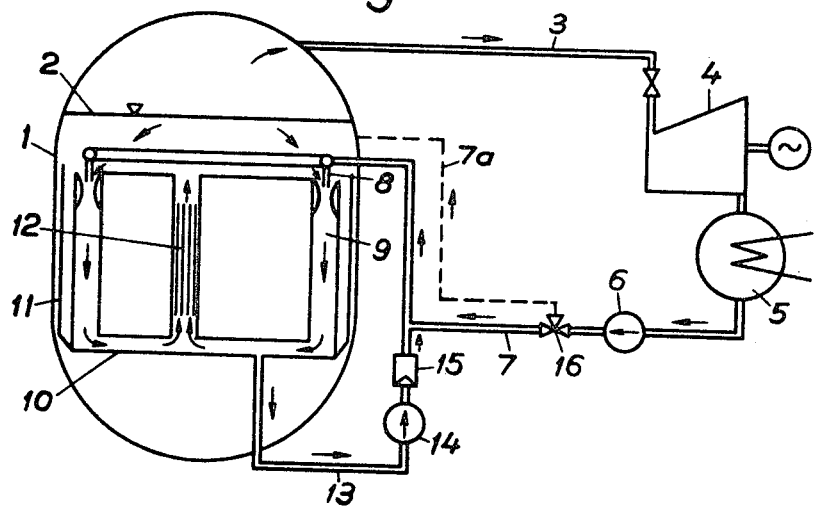
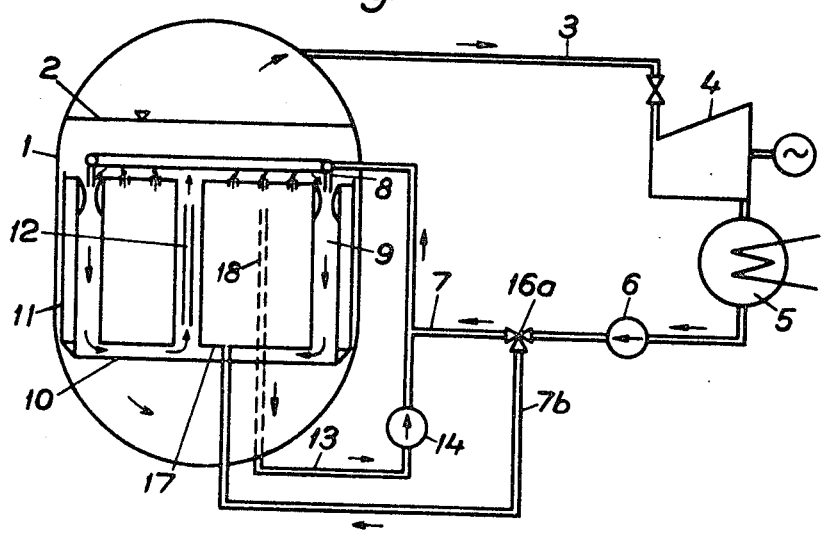
INVENTORS
KÅRE HÅNNERZ
KNUT SUNDQVIST
CARL GÖSTA SKYGGE
BY
Bailey, Stephens & Huettig
ATTORNEYS

United States Patent Office 3,446,704
Patented May 27, 1969

3,446,704
MEANS FOR POWER CONTROL IN NUCLEAR REACTORS
Kare Hånnerz, Cnut Sundqvist, and Carl Gösta Skygge, Vasteras, Sweden, assignors to Allmänna Svenska Elektriska Aktiebolaget, Vasteras, Sweden, a Swedish corporation
Filed Mar. 28, 1967, Ser. No. 626,452
Claims priority, application Sweden, Mar. 31, 1966, 4,290/66
Int. Cl. G21d 5/06
U.S. Cl. 176—61    11 Claims

ABSTRACT OF THE DISCLOSURE

A working medium flow control system for power control of a boiling water reactor from which the steam generated is led to a turbine, condensed, and returned to the reactor. At least part of the feed water is ejected as the operating fluid through the nozzles of vertical jet pumps discharging into a distributing vessel connecting the fuel assemblies. A conduit from the distributing vessel to the feed water conduit is provided with a pump to give an increased flow of operating fluid, thereby permitting control of working fluid flow and consequently of the reactor power independent of the feed water flow.

BACKGROUND OF THE INVENTION

Field of the invention

The present invention relates to a nuclear reactor comprising a core with fuel assemblies and a working medium surrounding the core and at least partially filling the reactor, arranged to flow through the core and through an outer circuit, which outer circuit is connected to the reactor as the operating flow in a number of jet pumps arranged to improve the flow of working medium in the reactor through the core.

The prior art

It is known to improve the thermal efficiency of a reactor by allowing the incoming working medium to comprise the operating flow in a number of jet pumps arranged to directly influence the flow through the reactor core. It is also known to control the power of the reactor by controlling the flow of the coolant in the reactor core in different ways. The object of the present invention is to effect a simplified and improved power control partly by making use of the advantages which may be gained by the known method of improving the flow in the reactor core by the aid of the incoming working medium.

SUMMARY OF THE INVENTION

The invention is characterized in that at least one auxiliary circuit is connected between the reactor and said outer circuit, which auxiliary circuit together with the outer circuit is included in a controllable system for controlling the flow through the jet pumps and/or the temperature in the inner parts of the reactor and thereby also the power of the reactor. By arranging an auxiliary circuit in the above manner it is possible to control the reactor power independently of the flow in the main circuit of the reactor plant. The invention also gives many possibilities, by different arrangement, for adapting the control range both in size and position so that the best control possibility is obtained for each reactor plant.

The simplest way to arrange an appropriate auxiliary circuit is to connect between the reactor and the outer circuit a circuit pumping working medium from the reactor to the outer circuit. To obtain the most effective control the medium in such an auxiliary circuit should have as low a temperature as possible and to attain this the auxiliary circuit is connected between the flow circuit leading from the jet pumps into the reactor core and said outer circuit. The auxiliary circuit is preferably arranged to start from a point near the reactor core at the feed side for the flow coming down the jet pumps. The auxiliary circuit is made controllable and by increasing and decreasing the flow in the auxiliary circuit the reactor power can be increased and decreased.

In order to obtain a greater control range in a reactor according to the invention, part of the flow in the outer circuit can be led away and form an extra auxiliary circuit which is led directly to the outer parts of the reactor, i.e. the parts situated outside the core and the jet pump circuit. In this case, the first-mentioned auxiliary circuit may possibly be completely omitted.

In heavy water reactors part of the working medium comprises a moderator and is surrounded by a special moderator vessel. In a reactor plant with such a reactor, according to the invention the outer circuit is divided into at least two branches, one of which provides the operating medium in the jet pumps and the other forms an auxiliary circuit which supplies working medium directly to the moderator. Between the reactor and the first-mentioned branch of the outer circuit the above described circuit supplying working medium from the reactor to the outer circuit is suitably arranged as a second auxiliary circuit. Control of the flow in the different circuits is suitably carried out by the aid of separate control means in each circuit. However, this is not necessary in all cases and one or more of these control means may be omitted. The simplest arrangement of the control system is obtained if the second auxiliary circuit starts from parts situated outside the core of the reactor and the jet pump circuit, preferably from the bottom of the reactor tank. Somewhat cooler medium is obtained in the second auxiliary circuit, however, if this is arranged to start from the upper part of the moderator.

In order to suitably divide the medium in the reactor and to protect the reactor tank itself from heat due to gamma rays a thermal shield is arranged to surround the core at the sides and which is provided at the lower part with a bottom, and in this way divide the operating medium in the reactor into an outer and inner part. The jet pump circuit belongs to the inner part and the jet pumps are therefore arranged inside the thermal shield. The pumps are suitably arranged in a manner known per se in vertical tubes. Particularly in heavy water reactors it is important that these tubes are made of a material having flow neutron absorption cross section in order to improve the neutron economy of the reactors. The tubes are connected to a collecting vessel under the core which is suitably formed by the bottom connected to the thermal shield and the medium coming from the jet pumps is thus controlled so that it flows up through the reactor core.

Brief description of the drawings

The invention will be further described in the following with reference to the accompanying figures which show schematically different embodiments of a reactor plant according to the invention. FIGURE 1 shows an installation with light water reactor and FIGURE 2 an installation with heavy water reactor.

Description of the preferred embodiments

In the figures 1 designates the reactor tank or container which is filled with water to the level 2. The water provides the working medium of the reactor and is converted in the reactor to steam which is led through the main steam conduit 3 to a turbine 4 and then further to a condenser 5 where the steam is condensed. The condensate is driven by a feed water pump 6 back to the reactor through a feed water conduit 7. In the reactor, the feed water is led to a number of jet pumps 8 which through tubes 9, which at least in heavy water reactors should consist of a material having low neutron absorption cross section, are connected to a distributing vessel 10 arranged to control the flowing medium so that it flows up through the fuel channels 12 of the reactor core. The flow in the jet pumps sucks with it the working medium in the reactor so that the flow through the fuel channels 12 is greater than in the turbine circuit 3–7. When brought into heat-transferring contact with the fuel in the fuel channels 12, the working medium is heated to the boiling point. A thermal shield 11 is arranged around the reactor core and the jet pumps 8. The shield 11 and distributing vessel 10 are built together and form a flow control vessel which divides the inner volume of the reactor into an inner and outer part.

In the embodiment according to FIGURE 1, an auxiliary circuit 13 provided with a variable delivery pump 14 and a check valve 15 leads from the distributing vessel 10 to the feed water conduit 7. By increasing and decreasing the flow in the auxiliary circuit 13, the operating flow in the jet pumps 8, and thus the circulation through the reactor core, is increased and decreased. Alterations in the circulation through the reactor core cause corresponding alterations in the reactor power.

To attain a greater control range for the operating flow in the jet pumps 8, part of the feed water in a parallel branch 7a can be led directly into the reactor tank. The conduit 7a starts from a three-way valve 16 which controls the flow in the conduits 7 and 7a. In this embodiment the auxiliary circuit 13 may be entirely omitted.

FIGURE 2 shows an embodiment of the invention which is designed taking into consideration the operating conditions in heavy water reactors. In a heavy water reactor the part of the working medium surrounding the fuel assemblies 12 forms the moderator for the reactor. The moderator is enclosed in a special tank 17 which is a partly detached part of the core. The embodiment according to FIGURE 2 differs from that shown in FIGURE 1 in that a branch 7b of the feed water conduit 7 leads directly to the moderator tank 17. A three-way valve 16a can be arranged in the same way as in FIGURE 1 to control the flow in the conduits 7 and 7b. By the aid of this valve and the pump 14 the flow through the reactor core and the temperature of the moderator can be controlled so that in this way the power of the reactor can be controlled within a relatively great range. As an example it may be mentioned that a temperature increase in the moderator of 10° C. can cause a power decrease of about 25%. Such a temperature increase in the moderator can be effected by decreasing the cold flow in the conduit 7b. In the embodiment according to FIGURE 2 the auxiliary circuit 13 is connected directly to the bottom of the reactor tank and not to the distributing vessel 10 as in FIGURE 1. This embodiment can be modified as shown by the dotted lines 18 by making the auxiliary circuit 13 start from the upper part of the reactor moderator where the operating medium is coldest. This embodiment is somewhat more expensive than that shown in unbroken lines, but it provides better control.

Besides the shown embodiments there are many other possibilities for modifying the control range. These possibilities, however, lie within the scope of normal technology so that a further description of them is unnecessary. Such modifications should be regarded as natural embodiments of the invention within the scope of the following claims.

What is claimed is:
1. A nuclear reactor system comprising a nuclear reactor having a core with fuel assemblies, a container (1), and liquid vaporizable working medium in said container surrounding the core and at least partially filling the container, an outer circuit (3–7) directly connected to the container, said outer circuit comprising a turbine (4), a main steam line (3) supplying the turbine (4) with vaporized working medium, condensing means (5), condensate pumping means (6) and a condensate feed line (7) supplying the reactor with condensed working medium, means (6, 8) to cause said working medium to flow through the core and through said outer circuit, said flow causing means including jet pump means (8) for improving the flow of working medium through said core and means (9–10) guiding the flow of working medium along a flow path from said jet pump means (8) to said core at its feed side for working medium, a first auxiliary circuit (13) arranged to transfer condensed working medium from the reactor to said outer circuit (3–7) at a point between said turbine (4) and said jet pump means (8), and means (14) controlling the flow of working medium in said first auxiliary circuit (13), thereby controlling the flow through said jet pump means (8), wherein the improvement comprises that said first auxiliary circuit (13) starts at a point in said flow path between said jet pump means (8) and said core.

2. In a nuclear reactor system according to claim 1, said first auxiliary circuit (13) starting at a point in said flow path near said core.

3. In a nuclear reactor system according to claim 1, said reactor being a boiling light water reactor, a second auxiliary circuit (7a) transferring condensate from the outer circuit (7) directly to the outer parts of the reactor.

4. In a nuclear reactor system according to claim 1, said flow guiding means comprising a vessel (10, 11) controlling the flow and dividing said container (1) into an outer part and an inner part, said vessel surrounding the core at least at the bottom and sides, said jet pump means (8) discharging into said inner part.

5. In a nuclear reactor system according to claim 4, said flow guiding means further comprising substantially vertical tubes (9) at the sides of the reactor core, said jet pump means (8) being arranged in said tubes, said tubes (9) being formed of a material having low neutron absorption and opening out at the bottom of said vessel (10, 11).

6. A nuclear reactor system comprising a nuclear reactor having a core with fuel assemblies, a container (1), and liquid vaporizable working medium in said container surrounding the core and at least partially filling the container, an outer circuit (3–7) directly connected to the container, said outer circuit comprising a turbine (4), a main steam line (3) supplying the turbine (4) with vaporized working medium, condensing means (5), condensate pumping means (6) and a condensate feed line (7) supplying the reactor with condensed working medium, means (6, 8) to cause said working medium to flow through the core and through said outer circuit, said flow causing means including jet pump means (8) for improving the flow of working medium through said core and means (9–10) guiding the flow of working medium along a flow path from said jet pump means (8) to said core at its feed side for working medium, a first auxiliary circuit (13) arranged to transfer condensed working medium from the reactor to said outer circuit (3–7) at a point between said turbine (4) and said jet pump means (8), and means (14) controlling the flow of working medium in said first auxiliary circuit (13), thereby controlling the flow through said jet pump means (8), said reactor being a boiling heavy water reactor, said reactor including a partly detached part (17) of said core, said working medium in said partly detached part constituting a moderator, wherein the improvement comprises that a second auxiliary circuit (7b) is arranged to transfer working medium from said outer circuit at a point between said turbine (4) and said jet pump means (8) directly to said partly detached part (17).

7. In a nuclear reactor system according to claim 6, said first auxiliary circuit (13) starting at a point in the container (1) outside the core of the reactor and the jet pump means circuit (8–10).

8. In a nuclear reactor system according to claim 6, said first auxiliary circuit (13) starting from the bottom of said container (1).

9. In a nuclear reactor system according to claim 6, said first auxiliary circuit (13, 18) starting from the upper part of said partly detached part (17).

10. In a nuclear reactor system according to claim 6, said flow guiding means comprising a vessel (10, 11) controlling the flow and dividing said container (1) into an outer part and an inner part, said vessel surrounding the core at least at the bottom and sides, said jet pump means (8) discharging into said inner part.

11. In a nuclear reactor system according to claim 10, said flow guiding means further comprising substantially vertical tubes (9) at the sides of the reactor core, said jet pump means (8) being arranged in said tubes, said tubes (9) being formed on material having low neutron absorption and opening out at the bottom of said vessel (10, 11).

References Cited

UNITED STATES PATENTS

| | | | |
|---|---|---|---|
| 2,861,033 | 11/1958 | Treshow | 176—56 |
| 3,042,600 | 7/1962 | Brooks | 176—56 |
| 3,098,812 | 7/1963 | Treshow | 176—56 |
| 3,108,937 | 10/1963 | Kumpf et al. | 176—61 |
| 3,202,584 | 8/1965 | Bogaardt et al. | 176—61 |
| 3,211,625 | 10/1965 | Setterwall | 176—61 |
| 3,249,506 | 5/1966 | Tower et al. | 176—61 |
| 3,274,065 | 9/1966 | Kierulf et al. | |
| 3,275,524 | 9/1966 | Williams | 176—56 |
| 3,284,312 | 11/1966 | West | 176—56 |

REUBEN EPSTEIN, *Primary Examiner.*

U.S. Cl. X.R.

176—56, 20